(12) United States Patent
Chen (10) Patent No.: US 8,922,982 B1
(45) Date of Patent: Dec. 30, 2014

(54) DETACHABLE PIVOTING CHASSIS FOR ELECTRONIC DEVICES

(71) Applicant: Can Technology Co., Ltd., Chung Li, Taoyuan Hsien (TW)

(72) Inventor: Tao-Shen Chen, Chung Li (TW)

(73) Assignee: Can Technology Co., Ltd., Chung Li, Taoyuan Hsien (TW)

( * ) Notice: Subject to any disclaimer, the term of this patent is extended or adjusted under 35 U.S.C. 154(b) by 63 days.

(21) Appl. No.: 13/935,641

(22) Filed: Jul. 5, 2013

(51) Int. Cl.
*G06F 1/16* (2006.01)

(52) U.S. Cl.
CPC .................................. *G06F 1/1667* (2013.01)
USPC ............. 361/679.17; 361/679.08; 361/679.41

(58) Field of Classification Search
CPC ... G06F 1/1632; G06F 1/1654; G06F 1/1662; G06F 1/1669
USPC ..................................................... 361/679.14
See application file for complete search history.

(56) References Cited

U.S. PATENT DOCUMENTS

| | | | |
|---|---|---|---|
| 6,727,894 B1 * | 4/2004 | Karidis et al. ................. | 345/174 |
| 7,136,282 B1 * | 11/2006 | Rebeske ................... | 361/679.55 |
| 2012/0106078 A1 * | 5/2012 | Probst et al. ............. | 361/679.56 |
| 2014/0254079 A1 * | 9/2014 | Yang ........................ | 361/679.09 |
| 2014/0285962 A1 * | 9/2014 | Staats et al. .............. | 361/679.43 |
| 2014/0293534 A1 * | 10/2014 | Siddiqui .................. | 361/679.55 |

* cited by examiner

*Primary Examiner* — Anthony Q Edwards
(74) *Attorney, Agent, or Firm* — Jackson IPG PLLC (57) ABSTRACT

A detachable pivoting chassis includes an accommodating base, a seat, a keyboard, a pivot module and a movable stand, and the accommodating base has an accommodating part for accommodating an electronic device, and the seat has an accommodating part for accommodating a keyboard, and the pivot module has at least two connecting elements and a pivoting element, and the connecting element is disposed on a side of the accommodating base and detachably coupled to the pivoting element, such that the accommodating base can be pivoted by the pivot module, and an end of the movable stand is pivotally coupled to an external side of the accommodating base, so that the electronic device can change its using status according to user requirements, and the detachable pivoting chassis can be combined with other electronic devices to provide the convenience of use.

14 Claims, 14 Drawing Sheets

DETACHABLE PIVOTING CHASSIS FOR ELECTRONIC DEVICES

FIELD OF THE INVENTION

The present invention relates to a detachable pivoting chassis for electronic devices, in particular to the detachable pivoting chassis capable of changing its using status according to user requirements.

BACKGROUND OF THE INVENTION

In recent years, the touch operation becomes increasingly popular since Smartphones have been introduced to the market, and manufacturers spare no effort to develop handheld touch electronic devices for Smartphones and tablet PCs. Handheld touch electronic devices are mainly operated by touching, so that the electronic devices can have a concise appearance, not only decreasing the volume effectively, but also reducing the weight effectively to facilitate users to carry the electronic devices.

However, if a user uses the handheld touch electronic device at home or in office, the user can input data to the handheld touch electronic device by a touch method such as a handwriting method or a software simulated keyboard, and thus the input speed cannot be compared with the conventional input through keyboard. In view of this problem, existing technologies use a wireless keyboard to pair a Bluetooth transmission module with a touch electronic device to input through the keyboard.

The aforementioned method of using a wireless keyboard to input data to the handheld touch electronic device requires users to put the wireless keyboard and the handheld touch electronic device on a support platform before the users can input data. Since the handheld touch electronic device generally requires the support stand to be erected, therefore when a user inputs data through the keyboard, the user has to carry a Bluetooth keyboard and a support stand for supporting the handheld touch electronic device. Obviously, such application is very inconvenient to the users.

SUMMARY OF THE INVENTION

Therefore, it is a primary objective of the present invention to overcome the aforementioned problem of the prior art by providing a detachable pivoting chassis for electronic devices, particularly the detachable pivoting chassis capable of changing its using status according to user requirements.

To achieve the aforementioned objective, the present invention provides a detachable pivoting chassis comprising: an accommodating base, a seat, a keyboard, a pivot module and a movable stand, wherein the accommodating base has an accommodating part for accommodating an electronic device; the seat has an accommodating part for accommodating a keyboard; the pivot module has at least two connecting elements and a pivoting element; and the connecting element is disposed at a side of the accommodating base and detachably coupled to the pivoting element, so that the accommodating base can be pivoted by the pivot module, and an end of the movable stand is pivotally coupled to an external side of the accommodating base.

The electronic device of the present invention can change its using status according to user requirements and can be combined with a keyboard to provide a convenient application. Compared with the prior art that uses another support stand to erect the electronic device, the present invention can fix the electronic device into the accommodating part of the accommodating base and achieve the supporting effect through the movable stand. In addition, users can assemble the detachable pivoting chassis to another electronic device to improve the convenience of use effectively.

DESCRIPTION OF THE PREFERRED EMBODIMENTS

The present invention will become clearer in light of the following detailed description of an illustrative embodiment of this invention described in connection with the drawings. It is intended that the embodiments and drawings disclosed herein are to be considered illustrative rather than restrictive.

Figure 1:
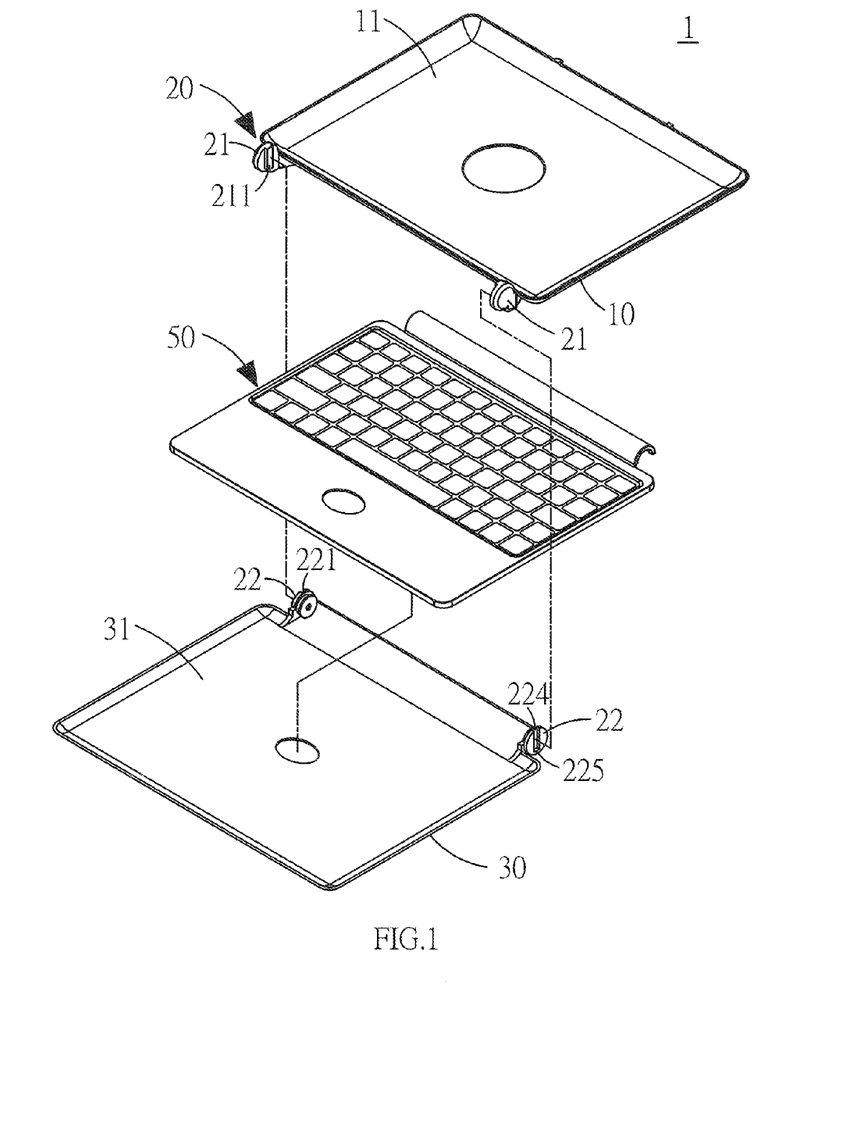
FIG. 1 is an exploded view of a detachable pivoting chassis of the present invention.
Figure 2:
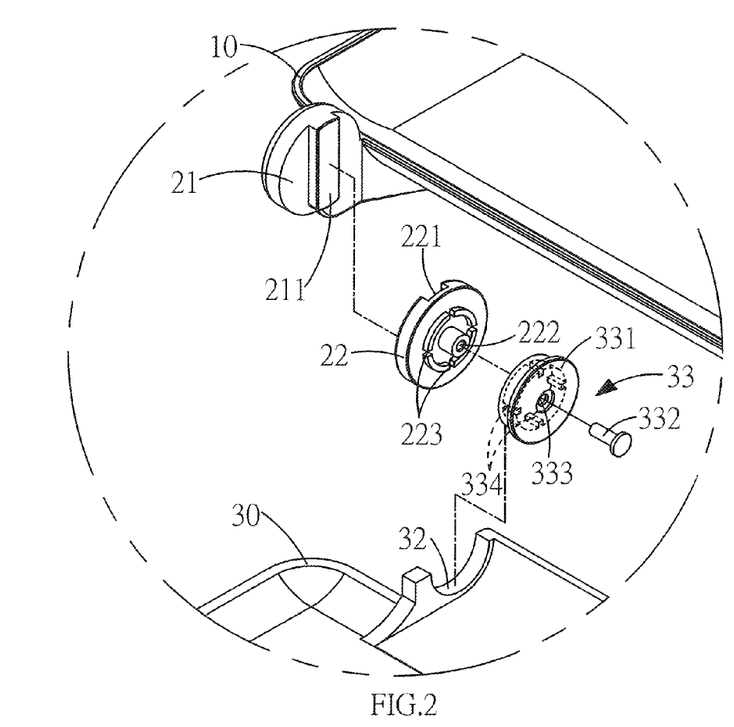
FIG. 2 is a blow-up exploded view of a detachable pivoting chassis of the present invention.
Figure 3:
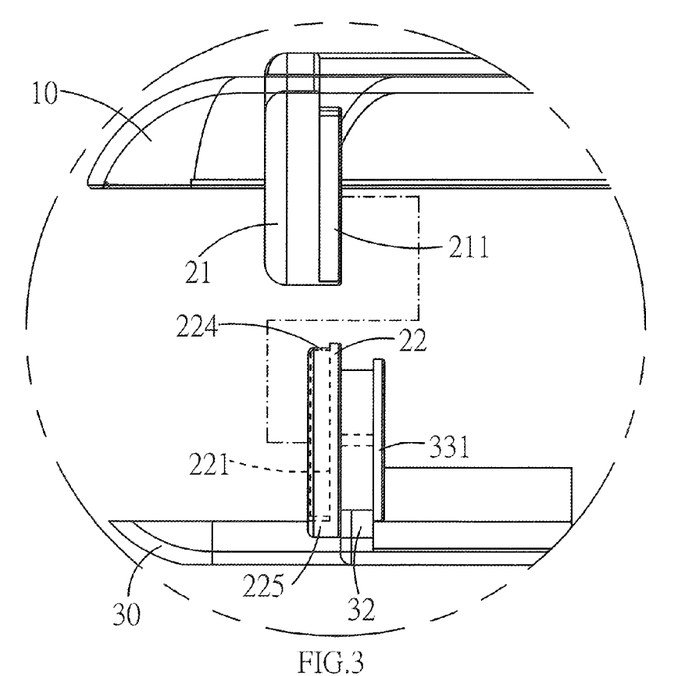
FIG. 3 is a schematic view of a detachable pivoting chassis of the present invention.

With reference to FIG. 1 for an exploded view of a detachable pivoting chassis of the present invention, the detachable pivoting chassis 1 comprises an accommodating base 10 and a pivot module 20, wherein the accommodating base 10 has an accommodating part 11 for accommodating an electronic device, and the pivot module 20 has at least two connecting elements 21 and a pivoting element 22. In a preferred embodiment as shown in FIG. 1, the accommodating base 10 has two connecting elements 21 disposed on sides of the accommodating base 10 respectively, and the connecting element 21 is detachably coupled to the pivoting element 22. In FIGS. 2 and 3, the connecting element 21 has an embedding bump 211, and the pivoting element 22 has a corresponding embedding groove 221, and the embedding groove 221 has an opening 224 formed on a side of the embedding groove 221 for inserting the embedding bump 211, and a closed section 225 disposed on the other side of the embedding groove 221 for latching the embedding bump 211. Of course, the embedding groove can be formed at the connecting element, and the corresponding embedding bump can be formed at the pivoting element and latchable into the embedding groove, and the connecting element can be integrally formed with the accommodating base, or combined with the accommodating base by an assembling process.

The pivoting element 22 is disposed at a seat 30, and the seat 30 has an accommodating part 31 for accommodating a keyboard 50, a circular seat 32 for fixing the pivoting element 22, and a coupling element 33 for fixing the pivoting element 22 to the circular seat 32, and the coupling element 33 has a fixing plate 331 and a fixing portion 332, wherein the fixing plate 331 and the pivoting element 22 have corresponding through holes 333, 222 for passing and fixing the fixing portion 332. Threads (not shown in the figure) are formed inside the through hole 222 and on the fixing portion 332, such that the fixing portion 332 can be fixed into the through hole 222 of the pivoting element in order to fix the pivoting element 22 to the circular seat 32. In addition, first and second latch portions 223, 334 are disposed and latched between the pivoting element 22 and the fixing plate 331 for enhancing the effect of fixing the pivoting element 22 and the fixing plate 331.

Figure 4:
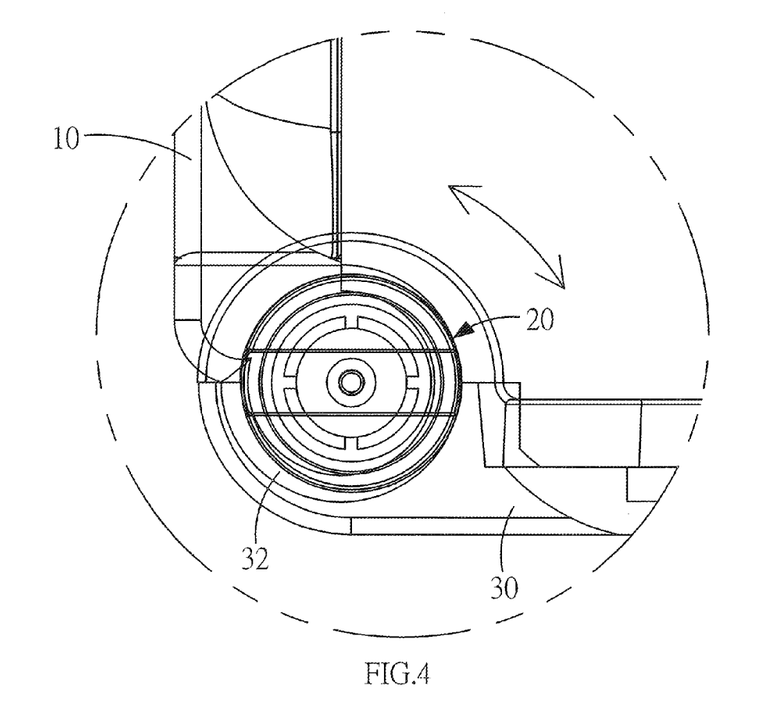
FIG. 4 is a blow-up view showing the use of a detachable pivoting chassis of the present invention.
Figure 5:
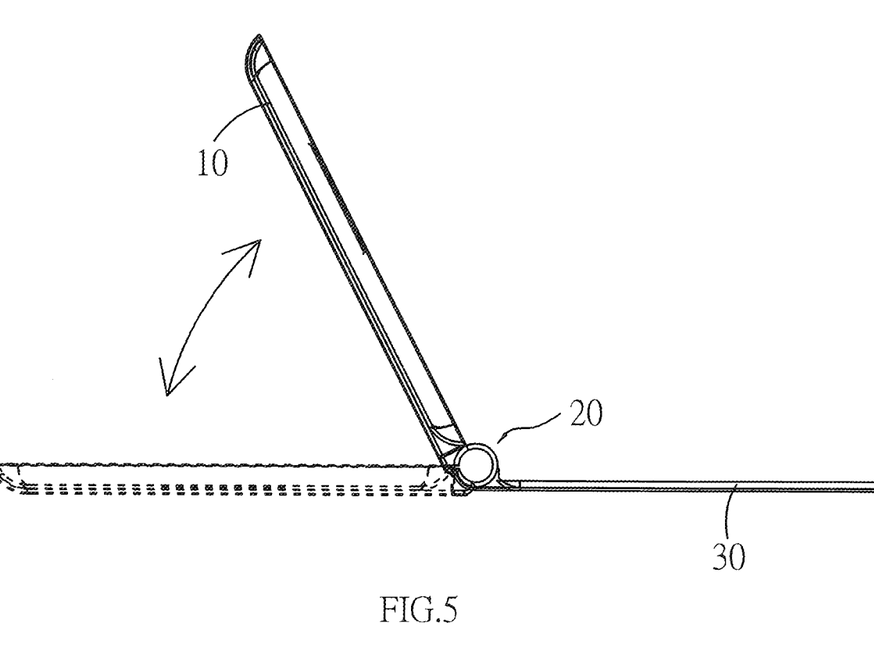
FIG. 5 is a schematic view showing the use of a detachable pivoting chassis of the present invention.

When use, the embedding bump 211 of the connecting element is latched into the embedding groove 221 of the pivoting element, so that the accommodating base 10 is pivotally coupled to the seat 30 and the pivoting element 22 can be rotated on the circular seat 32 as shown in FIGS. 4 and 5, and the accommodating base 10 can be pivoted on the seat 30 by the pivot module 20. Wherein, the accommodating part of the accommodating base can be used for mounting a tablet PC, and the accommodating part of the seat can be used for accommodating a keyboard. With the aforementioned assembling method, a user can connect the tablet PC with the keyboard for an application to produce the same feeling as operating a desktop computer or a notebook computer and for a long time of use. In addition, the pivot module can be used to adjust the angle for the use in order to facilitate users to view. Compared with a conventional electronic device that uses a support stand to erect the electronic device, the pivoting chassis of the present invention can accommodate and erect the tablet PC without requiring an additional support stand, so that the present invention is more convenient for carrying and using than the prior art. Of course, the accommodating base and the seat can also accommodate other electronic devices and change the use status according to user requirements.

Figure 6:
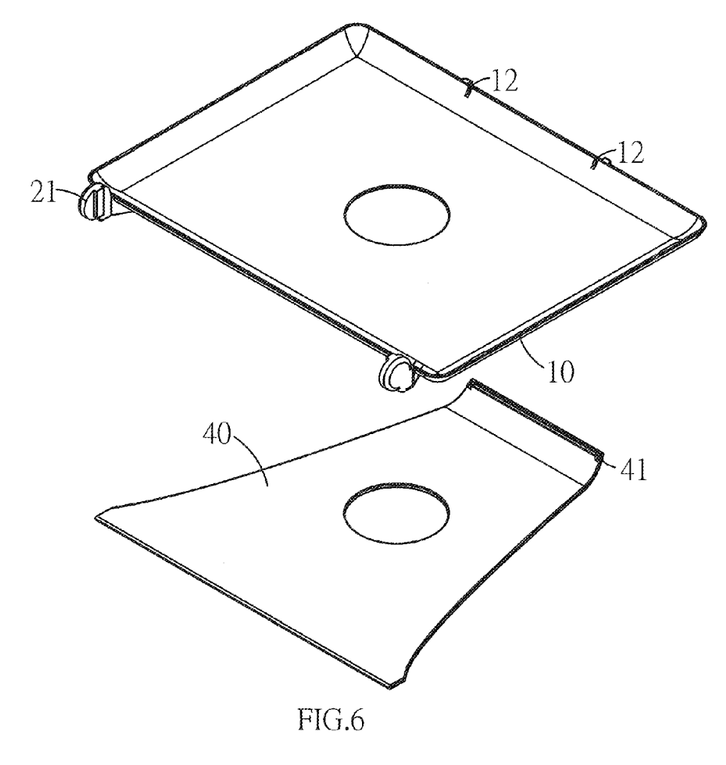
FIG. 6 is an exploded view of an accommodating base and a movable stand of the present invention.
Figure 7:
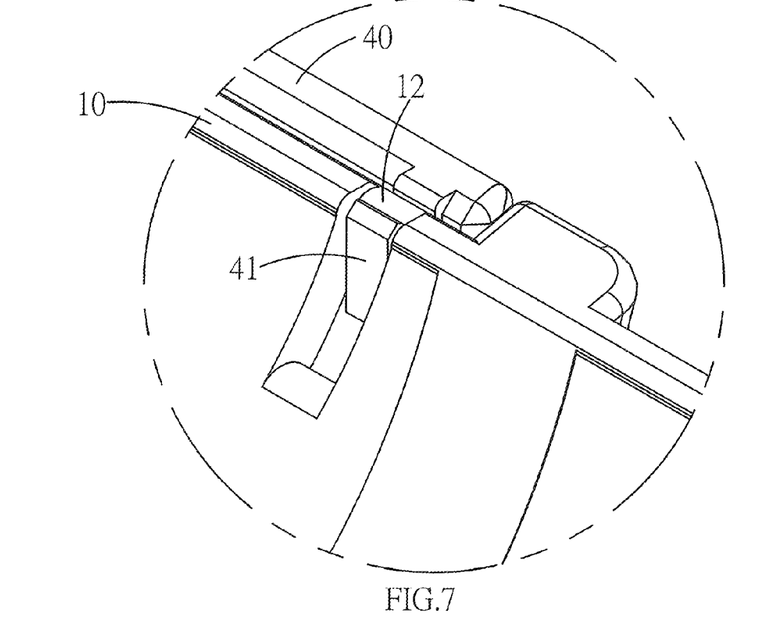
FIG. 7 is a perspective view of an accommodating base and a movable stand of the present invention.
Figure 8:
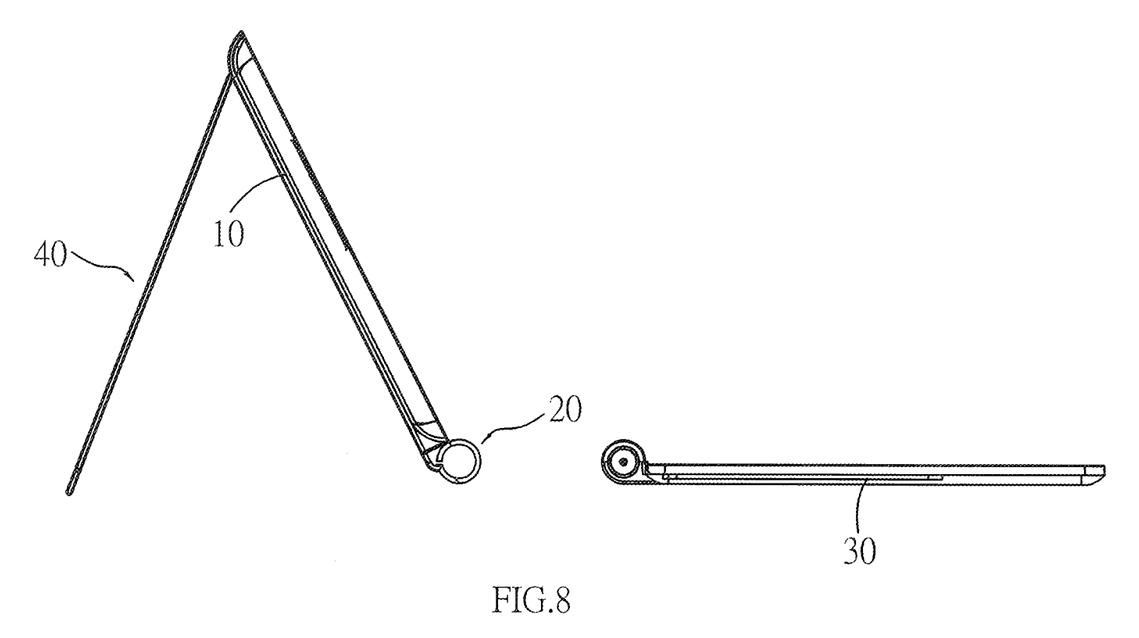
FIG. 8 is a schematic view showing the use of a movable stand of the present invention.

In addition, the pivoting chassis 1 further includes a movable stand 40 as shown in FIG. 6, and the movable stand 40 is pivotally coupled to an external side of the accommodating base 10, and the accommodating base 10 has at least one rotating shaft 12 disposed on the other side opposite to the connecting element 21. In FIG. 7, the movable stand 40 has a corresponding pivoting portion 41 pivotally coupled to the rotating shaft 12. When the accommodating base 10 is pivoted an appropriate angle as shown in FIG. 8, the movable stand 40 can slantingly prop the accommodating base 10 for disposing and supporting the electronic device at a position with an appropriate angle to facilitate the use of the electronic device. After the accommodating base 10 and the seat 30 are separated with a specific distance from each other, the users can keep a screen accommodated in the accommodating base 10 at specific distance, and the movable stand can be folded and attached onto the accommodating base when not in use, so as to prevent the structure from being exposed or affecting the aesthetic appearance and facilitate users to carry the pivoting base.

Figure 9:
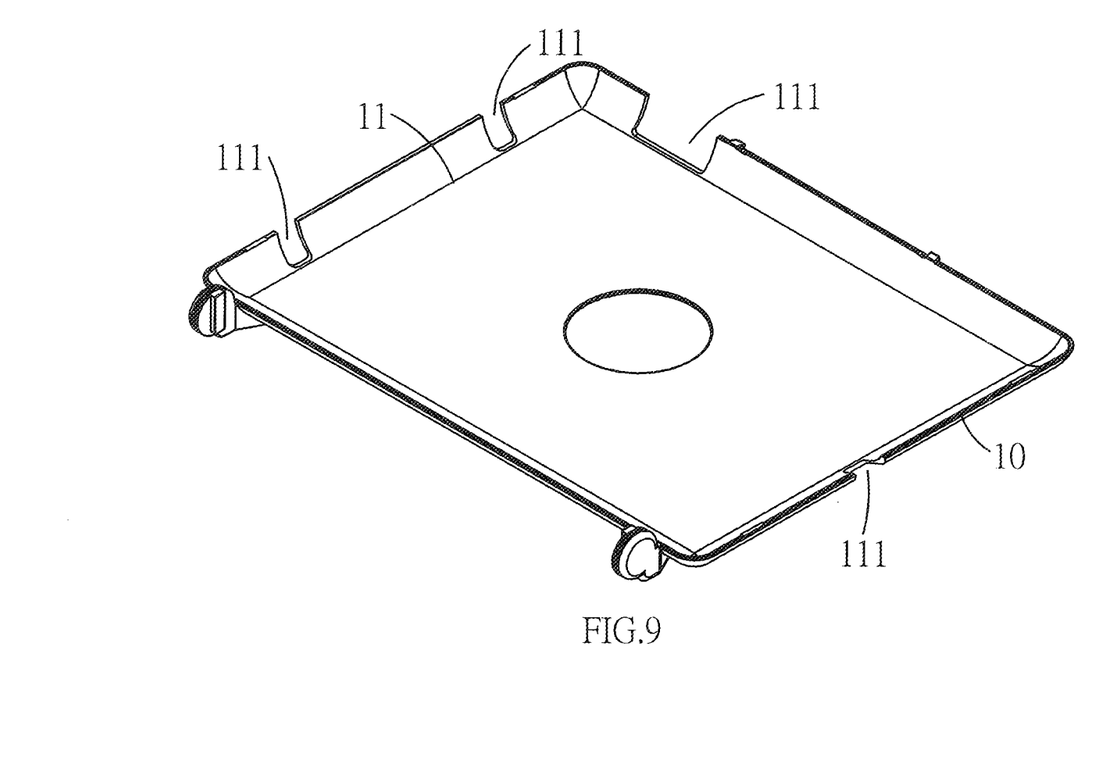
FIG. 9 is another perspective view of an accommodating base of the present invention.
Figure 10:
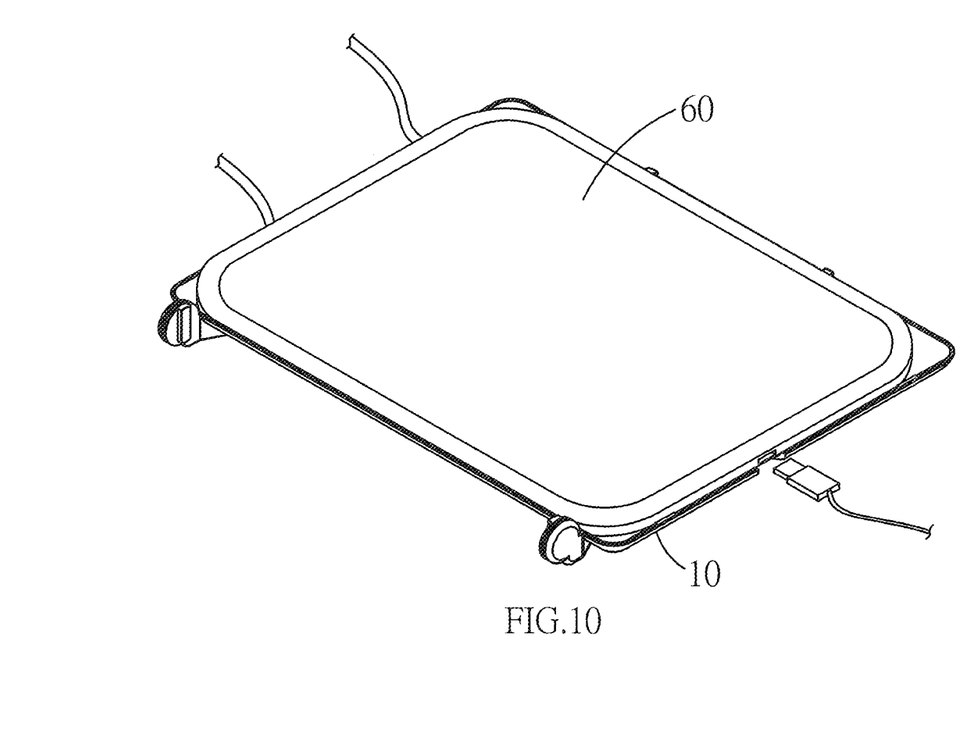
FIG. 10 is a perspective view of an accommodating base and an electronic device of the present invention.
Figure 11:
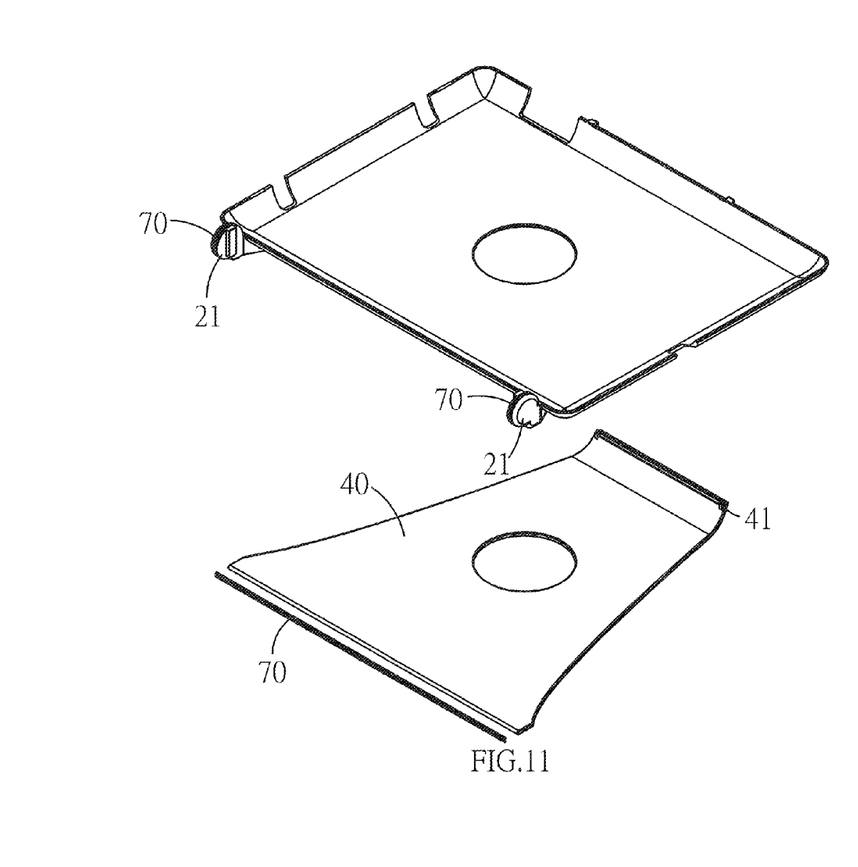
FIG. 11 another exploded view of an accommodating base and a movable stand of the present invention.
Figure 12:
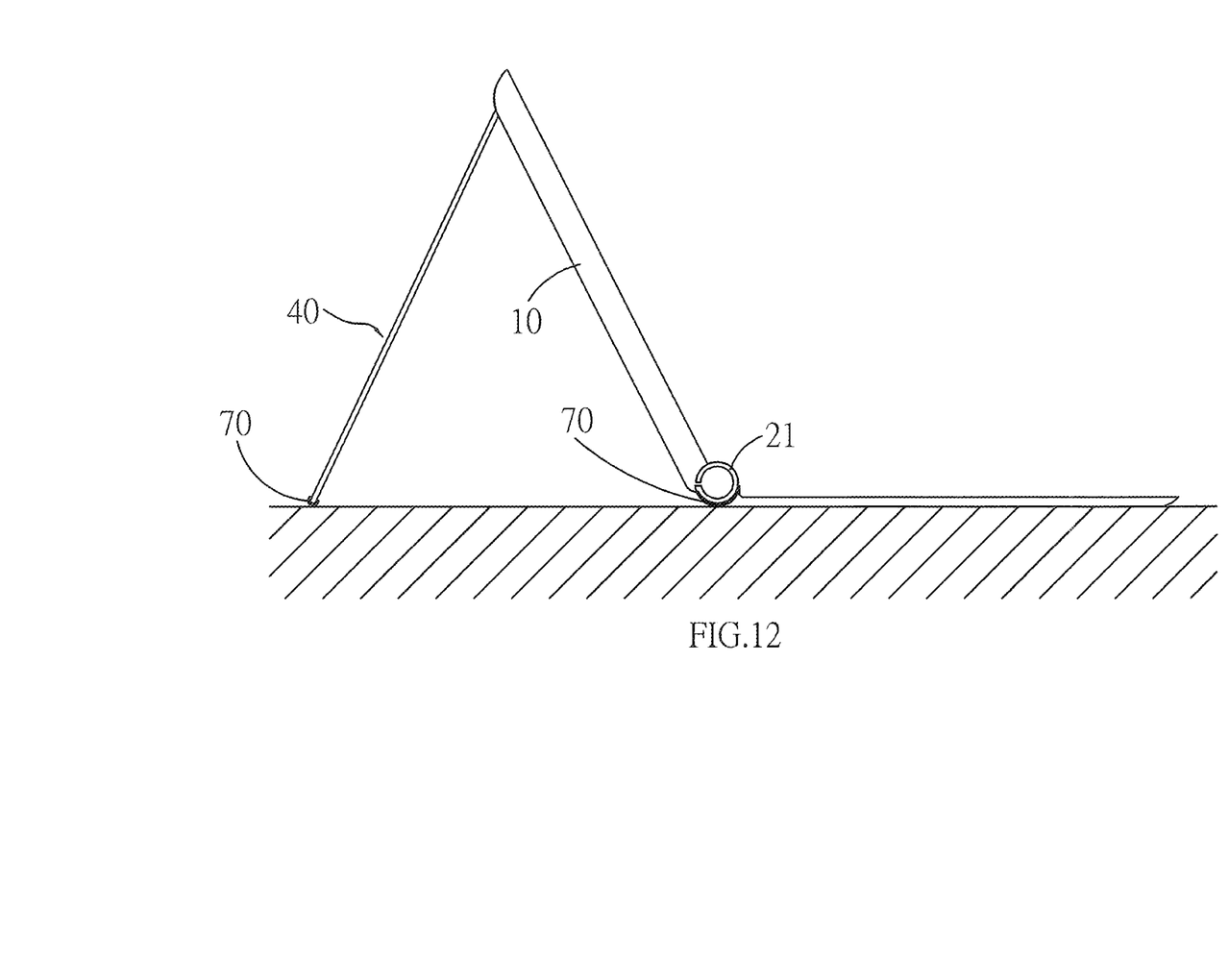
FIG. 12 is another schematic view showing the use of a movable stand of the present invention.

In addition, at least one window 111 is formed on a side of the accommodating part 11 of the accommodating base for exposing a cable or a function key of the electronic device 60 in the accommodating part 11 as shown in FIG. 9. Of course, the accommodating base 10 can be used separately to serve as a protective casing for protecting the electronic device 60 as shown in FIG. 10. In FIGS. 11 and 12, anti-slip structures 70 are disposed on the connecting element 21 and the movable stand 40 respectively, wherein the anti-slip structure 70 can be a plastic strip fixed on a surface of the connecting element 21 and fixed to the movable stand 40 and on the other surface opposite to the pivoting portion 41. When the movable stand 40 slantingly props the accommodating base 10, the anti-slip structures 70 are in contact with a using surface (such as a tabletop) to provide a relatively larger friction with the using surface, so as to achieve the anti-slip effect.

Figure 13:
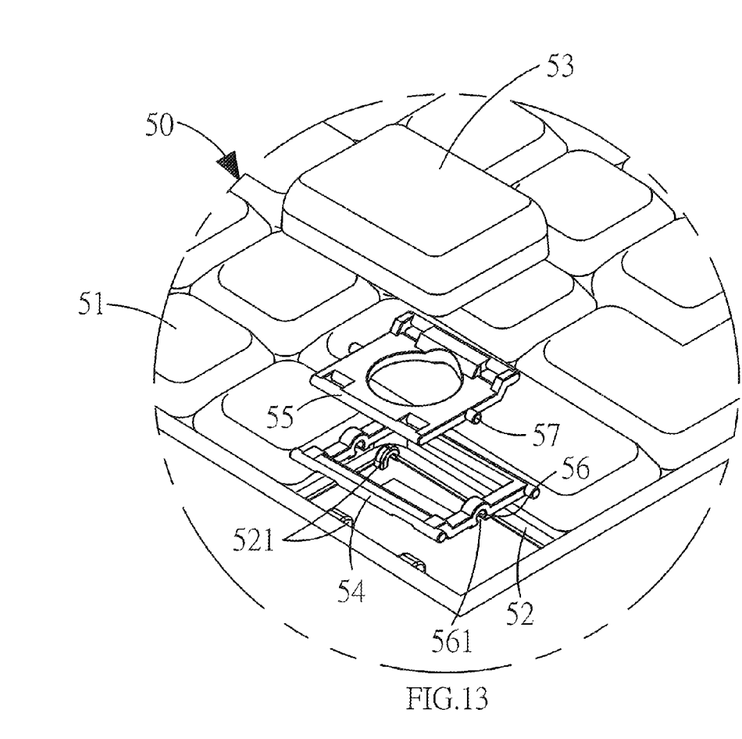
FIG. 13 is an exploded view of a keyboard of the present invention.
Figure 14:
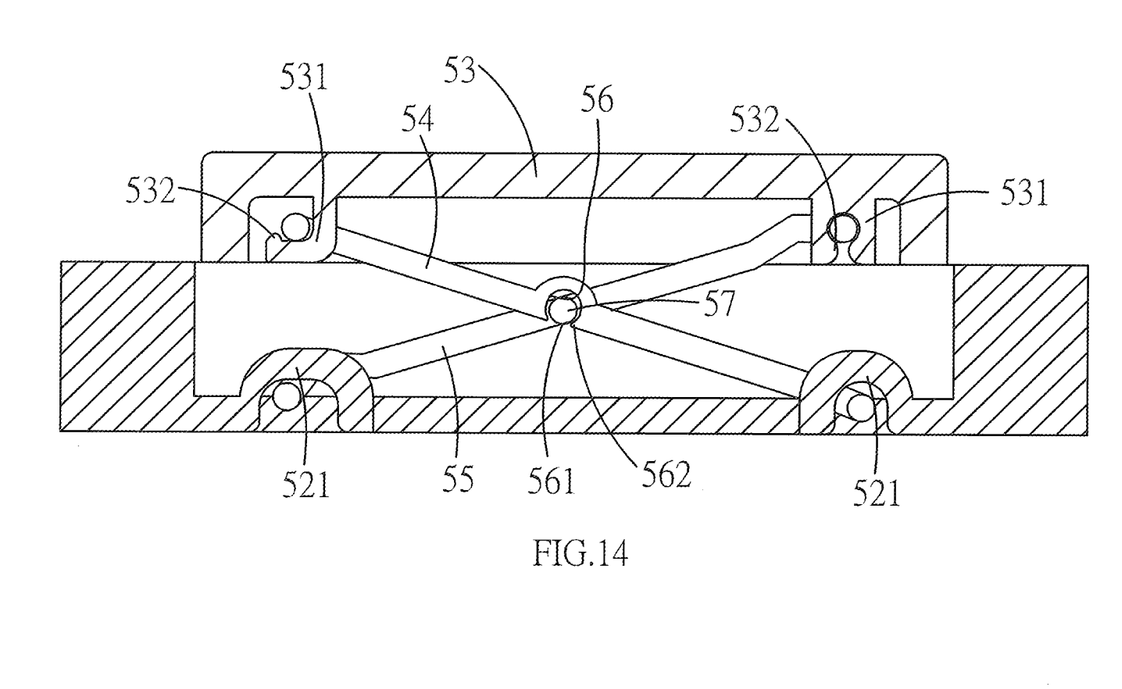
FIG. 14 is a schematic view of a press key of the present invention.

In addition, the keyboard 50 has a plurality of press keys 51 as shown in FIGS. 13 and 14, and the press key 51 includes a seat 52, a key cap 53 and crossly pivoted stands 54, 55, wherein a pair of first pivoting ears 521 are disposed on two corresponding sides of the top of the seat 52 respectively, and the key cap 53 is installed onto the top of the seat 52, and a pair of second pivoting ears 531 are disposed on two corresponding sides of the bottom of the seat 52 respectively, and shafts at both ends of the two stands 54, 55 are respectively and pivotally coupled to the first and second pivoting ears 521, 531, and a first inverted hook 532 is disposed at an opening of the second pivoting ear 531 and extended into a stand plug-in path, and a shaft hole 56 and a pivot 57 are disposed at the crossly pivoted position of the two stands 54, 55, and a notch 561 is formed at the main body under the shaft hole 56 for plugging the pivot 57 into shaft hole 56, and a second inverted hook 562 is disposed at an opening of the notch 561 and extended into a plug-in path of the pivot 57.

Under the interference produced by the second inverted hook 562 and the pivot 57, the overall press key structure limits the pivot 57 from withdrawing from the shaft hole 56 freely to effectively prevent the two crossly pivoted stands 54, 55 from being loosened. In addition, the interference produced by the first inverted hook 532 and the shafts at the rear ends of the two stands 54, 55 effectively prevents the key cap 53 from being loosened or falling off, so that the overall press key structure can be more secured and reliable. Particularly, when the pivot 57 is plugged into the shaft hole 56, and the shafts at the rear ends of the stands 54, 55 are inserted into the second pivoting ears 531, it is necessary to pass through the first inverted hook 532 and second inverted hook 562, so that a significant touch feeling is produced under the interference of the first inverted hook 532 and the second inverted hook 562, and assemblers can determine that the rotating shaft has surely passed through the inverted hooks into the shaft hole, so as to reduce the assembling time and labor and improve the defect-free rate of assembling the press keys.

What is claimed is:

1. A detachable pivoting chassis for electronic devices, comprising:
    an accommodating base, having an accommodating part for accommodating an electronic device;
    a seat, having an accommodating part for accommodating a keyboard;
    a keyboard, installed in the accommodating part of the seat, and having a plurality of press keys, each press key comprising: a seat, a key cap and two crossly pivoted stands, and a pair of first pivoting ears being disposed on two corresponding sides of the top of the seat respectively, and the key cap being disposed at the top of the seat, and a pair of second pivoting ears being disposed at two corresponding sides of the bottom of the seat respectively, and shafts at both ends of the two stands being pivotally coupled to the first and second pivoting ears respectively, and a first inverted hook being installed at an opening of the second pivoting ear and extended into a stand plug-in path, and the two stands having a shaft hole formed at the corresponding crossly pivoting position of the two stands and a pivot, and a notch being formed below the shaft hole and provided for plugging a pivot into the shaft hole, and a second inverted hook disposed at an opening of the notch and extended into the pivot plug-in path;

a pivot module, having at least two connecting elements and a pivoting element, and the connecting element being disposed on a side of the accommodating base, and the pivoting element being disposed on a side of the seat, and the connecting element being detachably coupled to the pivoting element, so that the accommodating base can be pivotally coupled onto the seat by the pivot module; and a movable stand, with an end pivotally coupled to an external side of the accommodating base.

2. The detachable pivoting chassis for electronic devices according to claim 1, wherein the connecting element has an embedding bump, and the pivoting element has a corresponding embedding groove for latching the embedding bump.

3. The detachable pivoting chassis for electronic devices according to claim 2, wherein the embedding groove has an opening formed on a side thereof and provided for inserting the embedding bump, and the embedding groove has a closed section formed on the other side thereof and provided for latching the embedding bump.

4. The detachable pivoting chassis for electronic devices according to claim 1, wherein the connecting element has an embedding groove, and the pivoting element having a corresponding embedding bump latchable into the embedding groove.

5. The detachable pivoting chassis for electronic devices according to claim 4, wherein the embedding groove has an opening formed on a side of the embedding groove for inserting the embedding bump, and a closed section disposed on the other side of the embedding groove for latching the embedding bump.

6. The detachable pivoting chassis for electronic devices according to claim 1, wherein the seat has a circular seat for fixing the pivoting element, and a coupling element capable of fixing the pivoting element to the circular seat.

7. The detachable pivoting chassis for electronic devices according to claim 6, wherein the coupling element has a fixing plate and a fixing portion, and the fixing plate and the pivoting element have a corresponding through hole for passing and fixing the fixing portion.

8. The detachable pivoting chassis for electronic devices according to claim 7, further comprising first and second latch portions disposed and latched between the pivoting element and the fixing plate for latching.

9. The detachable pivoting chassis for electronic devices according to claim 1, wherein the accommodating base has at least one rotating shaft disposed on a side opposite to the connecting element, and the movable stand has a corresponding pivoting portion pivotally coupled to the rotating shaft.

10. The detachable pivoting chassis for electronic devices according to claim 1, wherein the accommodating part of the accommodating base has at least one window formed on a side of the accommodating part.

11. The detachable pivoting chassis for electronic devices according to claim 1, wherein the connecting element has an anti-slip structure.

12. The detachable pivoting chassis for electronic devices according to claim 11, wherein the anti-slip structure is a plastic strip fixed onto a surface of the connecting element.

13. The detachable pivoting chassis for electronic devices according to claim 1, wherein the movable stand has an anti-slip structure.

14. The detachable pivoting chassis for electronic devices according to claim 13, wherein the anti-slip structure is a plastic strip fixed onto a surface of the movable stand and opposite to the other side of the pivoting portion.

\* \* \* \* \*